March 31, 1942.     R. T. STEINDORF     2,277,890
APPARATUS FOR FLOCCULATION
Filed Aug. 4, 1939     2 Sheets-Sheet 1
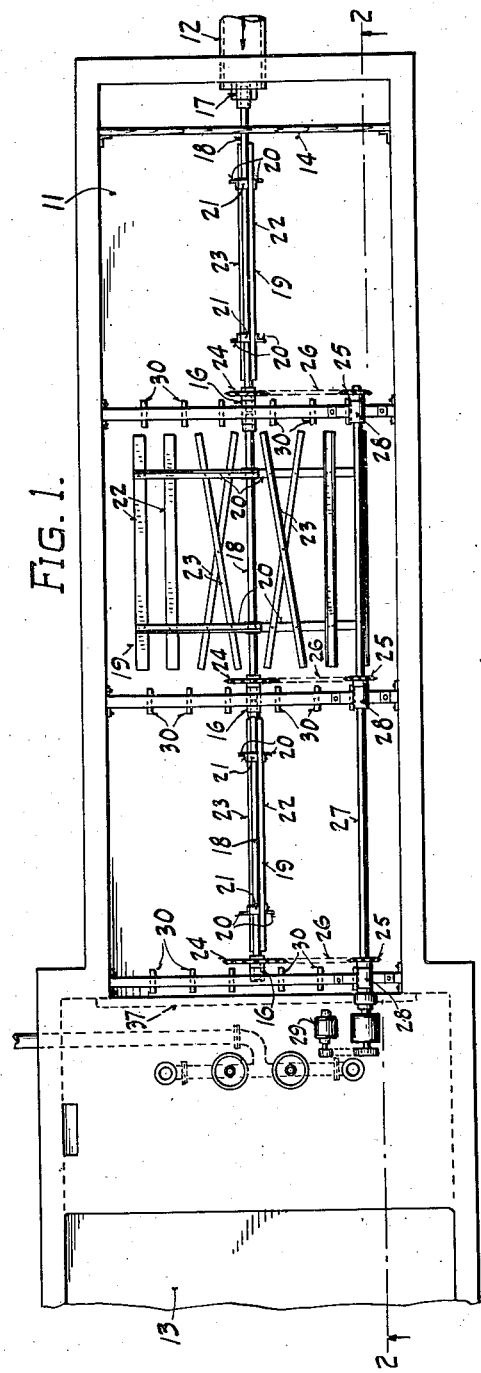
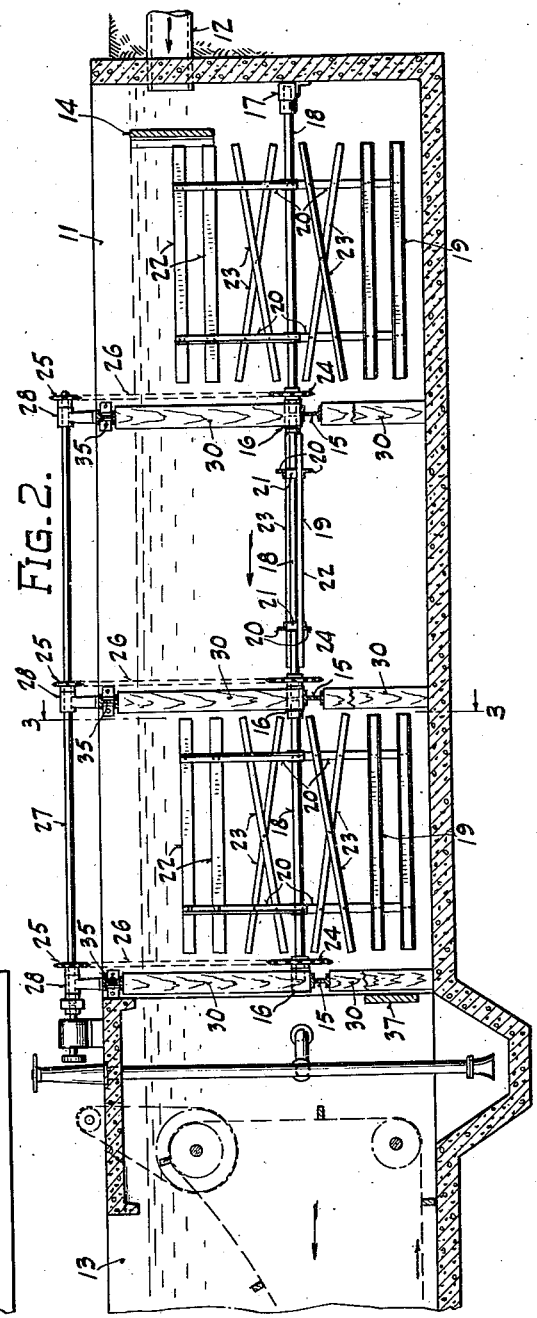
Robert T. Steindorf
INVENTOR.
BY George A. Evans
ATTORNEY.

March 31, 1942.    R. T. STEINDORF    2,277,890
APPARATUS FOR FLOCCULATION
Filed Aug. 4, 1939    2 Sheets-Sheet 2
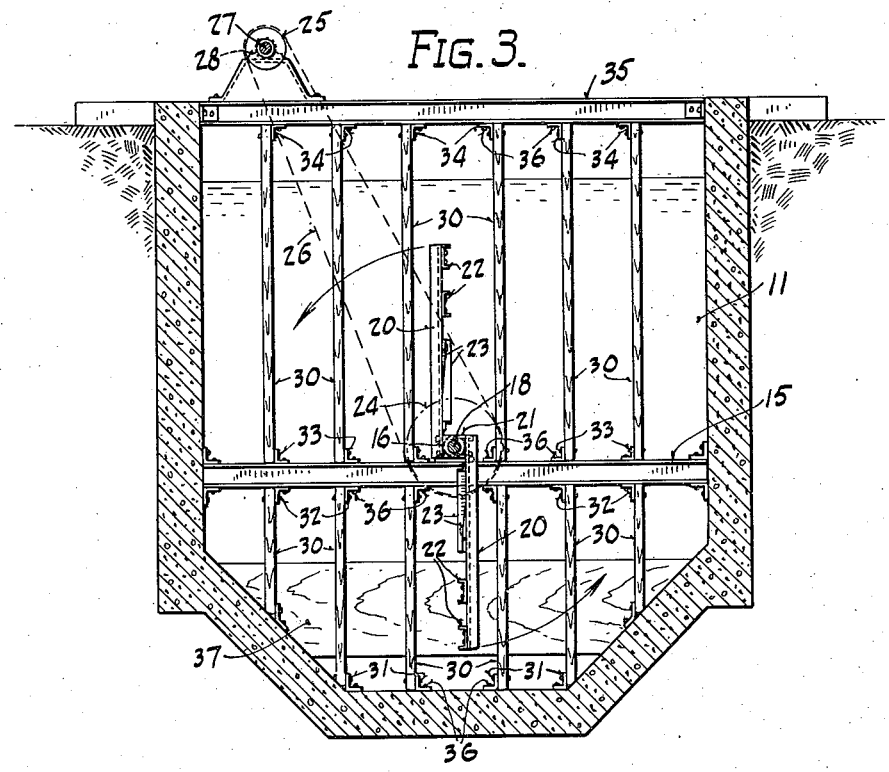
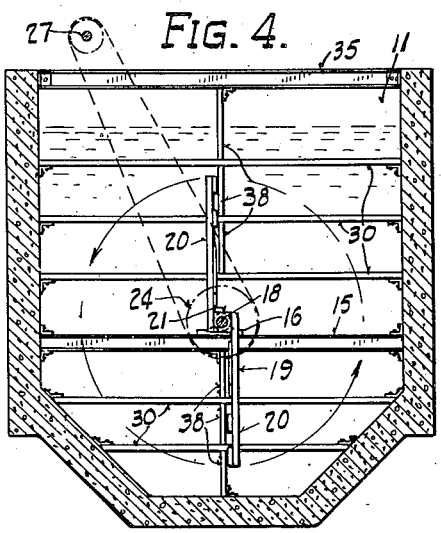
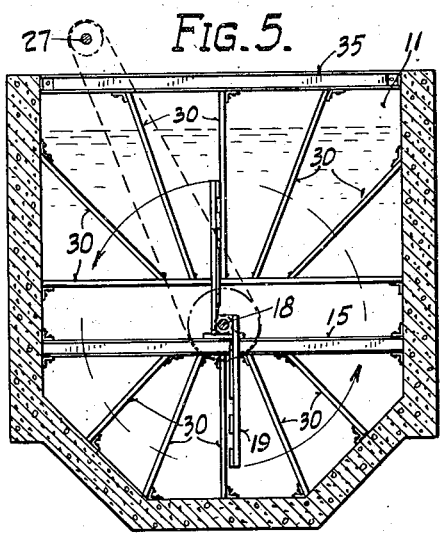
Robert T. Steindorf
INVENTOR.
BY George A. Evans
ATTORNEY.

Patented Mar. 31, 1942

2,277,890

UNITED STATES PATENT OFFICE 2,277,890

APPARATUS FOR FLOCCULATION

Robert T. Steindorf, Milwaukee, Wis., assignor to Chain Belt Company, Milwaukee, Wis., a corporation of Wisconsin Application August 4, 1939, Serial No. 288,345

3 Claims. (Cl. 259—9)

This invention relates to apparatus which is useful in the agglomerating of flocs in the treatment of liquids containing soluble and suspended matter, frequently of a colloidal nature. This agglomerating or flocculating process, as it is commonly called, involves agitating liquids in such a carefully controlled and regulated manner that particles of matter may be brought into contact by thorough but gentle inter-mixing. The effecting of this contact causes formation of flocs as well as floc growth to sizes sufficient to bring about precipitation of material not otherwise recoverable, with the result that such matter may be subsequently separated by sedimentation or other treatment.

The present invention has special application in the field of sewage treatment and water purification. In these fields, it is common to add chemicals which serve to coagulate and precipitate various substances called impurities, contained in the liquid undergoing treatment. This is generally accomplished by thorough mixing of the chemicals with the liquid in the initial phase of the process, and following this "rapid mixing" phase, the liquid is gently but thoroughly agitated for a time to bring about a maximum collision of the particles to create a flocculent, settleable mass of impurities.

It is contemplated that apparatus of the class here described will be used in connection with coagulation in conjunction with the use of chemicals, but this application is not exclusive and the invention will be found useful whether chemicals are employed or not.

Many theories have been advanced respecting flocculation and much apparatus has been designed to facilitate intended results predicated upon such theories. In promoting the most accepted version of flocculation, it is an object of the present invention to provide apparatus effecting a maximum collision of particles without disturbing injuriously such as by breaking up the already coagulated matter, whereby substantially complete removal of all impurities may be readily accomplished.

To this end, it is an object of the invention to provide impeller or agitating members which will impart a slow, spiral or transverse movement to liquid flowing in a horizontal direction and to interpose between such members along the direction of flow, members which will interrupt or straighten out the flow without substantially retarding or restricting it whereby subsequent impellers will be enabled to impart desirable agitation to the liquid to accomplish optimum flocculation results. By this arrangement of members acceleration of movement of particles in the direction of flow is prevented and more careful control of agitation is accomplished.

The invention is illustrated in the accompanying drawings, in which:

Fig. 1 is a plan view of a tank containing flocculation equipment.

Fig. 2 is a vertical section of the tank taken along the section 2—2 of Fig. 1;

Fig. 3 is a transverse section taken along the section 3—3 of Fig. 2;

Fig. 4 is a transverse section similar to Fig. 3 showing a modified form of the invention, and Fig. 5 is a view similar to Figs. 3 and 4 showing still further modifications.

Liquid enters the tank 11 through an influent pipe 12 disposed at one end of the tank. At the opposite end of the tank it may be permitted to pass through a settling compartment 13, shown in Figs. 1 and 2 as a continuation of the flocculating tank, or it may be conveyed by effluent means to a separate settling tank. The particular arrangement of tanks will depend upon the volume of liquid treated and the availability of space for their construction.

Arranged a short distance in front of the influent pipe 12 is a vertical baffle 14, deep enough to deflect the entire stream leaving the pipe so as to provide a flow under the baffle substantially uniformly at all points transversely of the tank. Spaced longitudinally of the tank are a series of horizontal transverse beams 15, made of any suitable material, the ends of which are carried by brackets mounted on the side walls of the tank. Supported in a central position on beams 15 are bearings 16, in alignment along the length of the tank for co-operation with each other, and with a bearing 17 mounted at the influent end of the tank, these bearings serving as journals for shafts 18 carrying the impeller or agitating members 19. In some instances, pedestals extending upwardly from the floor of the tank might be used instead of beams 15 for supporting the bearings 16, but the beams are preferable for reasons which will be subsequently explained.

The impeller members 19 are in the form of paddles with radial arms 20 rigidly secured to hubs 21 keyed or clamped to shafts 18. Flights or blades 22 connect the outer ends of the arms 20 and diagonal bars or braces 23 provide additional reinforcement and greater impelling surfaces for agitation. While the blade surface for each impeller is shown as being the same, it may be reduced or the position of the blades varied to have less impelling effect in later stages of flocculation in accordance with the theory that the agitation should decrease as floc formation progresses. In this case one continuous shaft might be employed, but by using separate shafts, as shown in the drawings, for each impelling member, it is possible to drive the several paddles at different relative speeds and thus accomplish substantially the same result with paddles of uniform size and blade surface.

To rotate the impellers 19, foot sprockets 24 are mounted on shafts 18, said sprockets 24 being driven from head sprockets 25 by means of chain 26. A single shaft 27 journalled in bearings 28 and driven by motor 29 through suitable reducing gearing, may carry all the head sprockets 25 and transmit power to each of the impellers 19. By selecting foot or head sprockets of different sizes, the proper reduction in speed may be obtained between successive impellers to produce desirable flocculating conditions.

Arranged in parallel alignment above and below transverse beams 15 are a number of vertical deflecting members or baffles 30. The baffles 30 are constructed either of wood or metal, are relatively thin in a crosswise direction of the tank, but of substantial width lengthwise of the tank so as to retard or deflect any rotary or spiral motion of the liquid imparted thereto by the impellers. The baffles on the lower side of the beam 15 are supported by brackets 31 mounted on the bottom of the tank and by brackets 32 fastened to the lower side of the beam. Those above the beam are secured by suitable brackets 33 on the upper side of the beam and by brackets 34 attached to another transverse member 35 at the top of the tank. Where pedestals are employed instead of beams to support the bearings 16, the baffles may be continuous for the depth of the tank. By using only one bolt 36 to fasten each of the brackets listed above, it is possible to rotate the upper and lower baffles 30 about a vertical axis and vary the angle of deflection of liquid striking the baffle to accommodate variations in flow which may possibly occur. The transverse member 35 may serve not only to support the upper ends of the baffle members 30, but also the bearings 28, thus enabling the latter to be located over the tank and reducing the length of chain necessary to drive the foot sprockets. The baffle structure may also provide a convenient support for the motor 29 and such gear reduction mechanism as may be employed.

Rearward of the last set of baffles 30 is a discharge baffle 37 which extends transversely of the tank near the bottom thereof to cause liquid flowing into the sedimentation chamber 13 to have an elevated inlet. The apparatus contained in the sedimentation chamber is not described as it is conventional and forms no part of this invention.

With the apparatus described, liquid flowing under the baffle 14 is initially agitated by the first impeller 19 of the series. Since this impeller rotates in a direction transversely to the direction of flow, the resultant movement of liquid is spiral and since all impellers or paddles 19 rotate in the same direction the spiral would be continuous for the length of the tank were it not for the baffles 30. Moreover, where the flow is uninterrupted there is a central section or core which receives very slight agitation.

Provision of baffles 30 between impellers 19 interrupts and straightens out the flow, as these baffles have sufficient width to cause contact of liquid which is moving in a spiral direction and prevent it from continuing such motion after passing between the baffles. By arranging these baffles parallel to the length of the tank they afford no substantial restriction to longitudinal flow and accordingly there are no areas behind them not available for mixing purposes as would be the case where restricted openings were provided through which the liquid would have to diffuse.

In Figure 4 a modified form of the invention is illustrated in which the baffles 30 are arranged horizontally of the tank instead of vertically, as in the form previously described. Vertical baffles 38 are disposed centrally of the tank at each set of horizontal baffles in order that the spiral flow of the liquid may be interrupted at the top and bottom of the tank where the horizontal baffles are tangent to the arc described by impellers 19. In this respect baffles 38 serve the same function as beams 15, shown in Figures 1–3, inclusive, and this is one of the reasons why the beam method of supporting the shafts is preferable to the use of built up pedestals. Another modification is shown in Figure 5, in which baffles 30 are disposed substantially radially about the axis of impeller 19.

In each form, the baffles have substantial width in the direction of liquid flow and oppose the spiral motion set up by the impeller members with the result that agitation effected by subsequent impellers is complete and unaffected by agitation in previous zones of the tank where other impeller members are operated. In this way it is possible to so control and regulate the degree of agitation in the various parts or zones of the tank that optimum floc-formation may be ultimately obtained.

While the invention has been described in connection with one line of paddles arranged in the direction of flow, it is frequently desirable to have a plurality of such rows parallel to each other. In this case it is necessary to employ a wider tank, extend the beams 15 and 35, shown in Figures 1 to 3, and provide additional vertical baffles, or extend the baffles 30 shown in Figure 4. Where radial baffles are employed, as shown in Figure 5, it is preferable to design a pattern around each paddle axis.

I claim:

1. In apparatus of the class described, the combination of a tank, horizontal shafting parallel to the length of said tank and in the direction of liquid flow, paddles mounted on said shafting arranged to impart a spiral motion to liquid in said tank, sets of baffles arranged between said paddles, said baffles having substantial width lengthwise of the tank, but affording no substantial retardation of the flow therethrough and means for revolving said paddles at different velocities.

2. In apparatus of the class described, the combination of a tank having side walls and influent and effluent means at opposite ends thereof, a set of baffles spaced a distance from an end of the tank along the direction of flow and comprising members having appreciable depth parallel to the general flow direction through said tank but affording no substantial retardation of the rate thereof, and means interposed between the baffles and the end of the tank for imparting agitative effects on the liquid without altering the rate of flow of liquid through the tank.

3. In apparatus of the class described, the combination of a tank having side walls and influent and effluent means for liquid flowing through said tank disposed at opposite ends thereof, a set of baffles spaced a distance from one end of said tank, comprising members having appreciable depth parallel to said flow and affording no substantial retardation of the rate thereof, and means interposed between said baffles and one end of the tank for setting up a spiral flow motion about an axis parallel to said side walls without accelerating the rate of flow.

ROBERT T. STEINDORF.